US008507020B2

(12) United States Patent
DesLauriers et al.

(10) Patent No.: US 8,507,020 B2
(45) Date of Patent: Aug. 13, 2013

(54) GAS FLUSH HIGH PRESSURE PASTEURIZATION PACKAGING AND ASSOCIATED METHODS

(75) Inventors: Gary DesLauriers, Aurora, IL (US); Paul Wolfert, Danville, CA (US)

(73) Assignee: Columbus Manufacturing, Inc., Hayward, CA (US)

( * ) Notice: Subject to any disclaimer, the term of this patent is extended or adjusted under 35 U.S.C. 154(b) by 24 days.

(21) Appl. No.: 12/968,175

(22) Filed: Dec. 14, 2010

(65) Prior Publication Data

US 2012/0031798 A1  Feb. 9, 2012

Related U.S. Application Data

(60) Provisional application No. 61/370,415, filed on Aug. 3, 2010.

(51) Int. Cl.
*B65B 25/06* (2006.01)

(52) U.S. Cl.
USPC ............ 426/397; 426/407; 426/396; 53/440; 53/428; 53/432

(58) Field of Classification Search
USPC ................ 426/397, 395, 407, 399, 403, 404, 426/396; 53/440, 428, 432, 442
See application file for complete search history.

(56) References Cited

U.S. PATENT DOCUMENTS

| 4,409,252 A | * | 10/1983 | Buschkens et al. | 426/396 |
| 4,919,955 A | | 4/1990 | Mitchell | |
| 5,283,033 A | * | 2/1994 | Dodrill | 422/21 |
| 2006/0099306 A1 | * | 5/2006 | Miller | 426/106 |
| 2007/0237865 A1 | | 10/2007 | Love et al. | |
| 2009/0291174 A1 | * | 11/2009 | Lewis | 426/399 |

FOREIGN PATENT DOCUMENTS

| EP | 2017176 A1 | 1/2009 |
| KR | 1020000062631 A | 10/2000 |
| WO | WO-2012018941 A2 | 2/2012 |

OTHER PUBLICATIONS

International Searching Authority, International Search Report and Written Opinion, Patent Application PCT/US2011/046466, mailed Mar. 28, 2012, 9 pages.

* cited by examiner

*Primary Examiner* — Rena Dye
*Assistant Examiner* — Chaim Smith
(74) *Attorney, Agent, or Firm* — Perkins Coie LLP

(57) ABSTRACT

The present disclosure is directed to systems and methods for packaging perishable foods. A packaging method in accordance with several embodiments of the disclosure can include, for example, mating a tray with a product. The tray can include a compartment having a generally similar shape as the shape of the product. The method can further include gas flushing an internal atmosphere around a product, and sealing the product and the internal atmosphere between a lid and the tray. Additionally, the method can include pasteurizing the product with an application of substantially uniform high pressure to a surface area of the package (e.g., high pressure pasteurization).

18 Claims, 6 Drawing Sheets

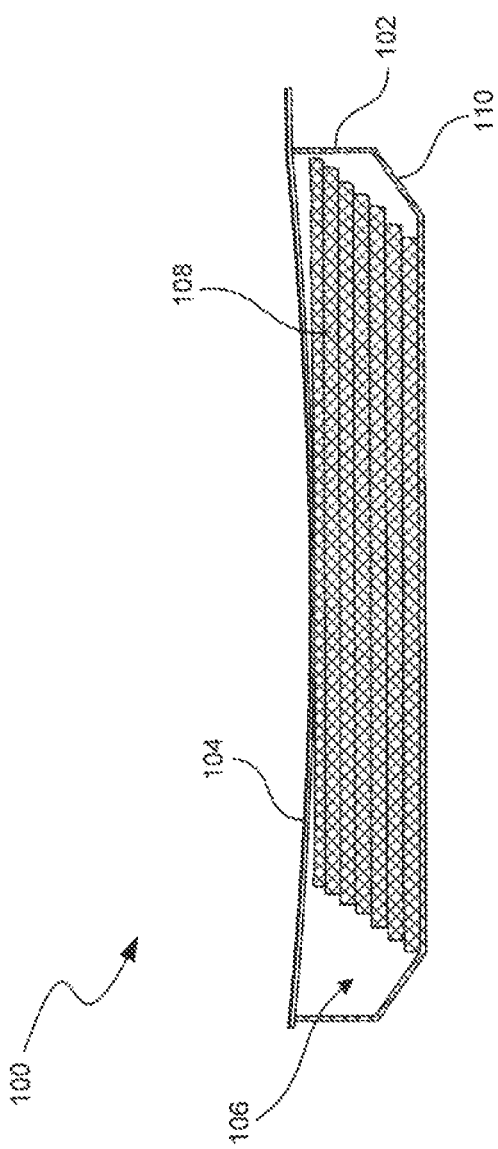

GAS FLUSH HIGH PRESSURE PASTEURIZATION PACKAGING AND ASSOCIATED METHODS

CROSS-REFERENCE TO RELATED APPLICATION(S)

The present application claims the benefit of U.S. Provisional Application No. 61/370,415 filed on Aug. 3, 2010, the disclosure of which is incorporated herein by reference in its entirety.

TECHNICAL FIELD

The present disclosure relates generally to packaging perishable products and, more particularly, to gas flush and high pressure pasteurization packaging.

BACKGROUND

Perishable products (e.g., meats, cheeses, fruits, medications, etc.) are generally packaged at a processing facility prior to shipment to retail outlets and/or consumers. Exposure of perishable products to ambient air (e.g., an oxygen-nitrogen atmosphere) results in spoilage. Thus, to extend the shelf lives of perishable products, conventional, packages confine perishable products in atmospheres that inhibit the growth of pathogens. For example, a conventional package includes two impermeable membranes that form a hermetic seal around a product. Such a package can also seal in a gas or gas mixture other than ambient air that extends the shelf life of the product more than a vacuumed package. The gas or gas mixture can be inserted into the package using gas flushing methods, e.g., modified atmosphere packaging ("MAP") and controlled atmosphere packaging ("CAP"). MAP modifies the internal atmosphere of a package by injecting a desired gas mixture (e.g., nitrogen, carbon dioxide, etc.), whereas CAP controls a defined mix of gases with an external apparatus or internal chemical reactions.

More recently, processing facilities have implemented high pressure pasteurization ("HPP") methods to package and preserve some perishable products. Conventional HPP methods include placing a package in an enclosure (e.g., a water tank) and applying a uniform pressure (e.g., hydraulic pressure) to a surface area of the package. With little to no heat treatment, the intensity and duration of pressure can effectively destroy pathogenic microorganisms in the product by interrupting their cellular functions. Thus, unlike traditional pasteurization, HPP can pasteurize heat sensitive products. Additionally, the absence of heat treatment during HPP can facilitate the retention of freshness, flavor, color, and nutrients of packaged foods. HPP also extends the shelf life of products compared to conventional gas flush packaging, and generally reduces the process time of traditional pasteurization. However, conventional HPP packages include little to no free space since the application of high pressure (e.g., 87,000 psi (5,998 bar)) compresses packaging materials. If the package includes free space, the high pressure can cause packaging materials and hermetic seals to rupture. Thus, conventional HPP packaging is generally suited for products having mostly homogenous consistencies (e.g., guacamole, applesauce, etc.) that do not require free space within packages for the separation of distinct sections and/or components.

BRIEF DESCRIPTION OF THE DRAWINGS

FIG. 1C is a cross-sectional view of the package taken along the line 1C-1C of FIG. 1B.

DETAILED DESCRIPTION

The present disclosure describes methods and systems (collectively, "technology") for gas flush high pressure pasteurization packaging. A packaging method configured in accordance with several embodiments of the disclosure can include, for example, positioning a perishable product in a compartment of a tray. The compartment and the product can have generally similar shapes, such that the tray mates with the product. The method can further include attaching a lid to a portion of the container and over the product to form a package. The package can be gas flushed, hermetically sealed, and undergo high pressure pasteurization ("HPP") without rupturing the package or damaging the product. Perishable products packaged in accordance with the technology benefit from a longer shelf life than conventional gas flush packaged products (e.g., triple the shelf life). Additionally, packages configured in accordance with the technology can include more free space (e.g., greater than 10% free space) than conventional HPP packages. As an example, a package having a total volume exceeding 110 mL may contain a product having a volume of 100 mL. The additional free space can prevent HPP from crushing and/or smashing the product. Thus, despite the application of high pressure, packaged products configured in accordance with the present technology can preserve the separability of sections (e.g., slices of cheese) and/or the integrity of distinct components (e.g., fruit and nuts in fruitcake) of the product, while still benefiting from the advantages of HPP (e.g., an extended shelf life).

Certain details are set forth in the following description and in FIGS. 1A-4 to provide a thorough understanding of various embodiments of the disclosure. For example, the term tray generally refers to any container (e.g., pre-formed tray, blister) configured to at least partially enclose or otherwise receive a product. Other well-known structures and systems often associated with packaging perishable products have not been shown or described in detail below to avoid unnecessarily obscuring the descriptions of the various embodiments of the technology. Additionally, a person of ordinary skill in the relevant art will understand that the technology may have additional embodiments that may be practiced without several of the details described below. In other instances, those of ordinary skill in the relevant art will appreciate that the methods and systems described can include additional details without departing from the spirit or scope of the disclosed embodiments.

In the Figures, identical reference numbers identify identical or at least generally similar elements. To facilitate the discussion of any particular element, the most significant digit or digits of any reference number refers to the Figure in which that element is first introduced. For example, element 100 is first introduced and discussed with reference to FIG. 1.

Figure 1A:
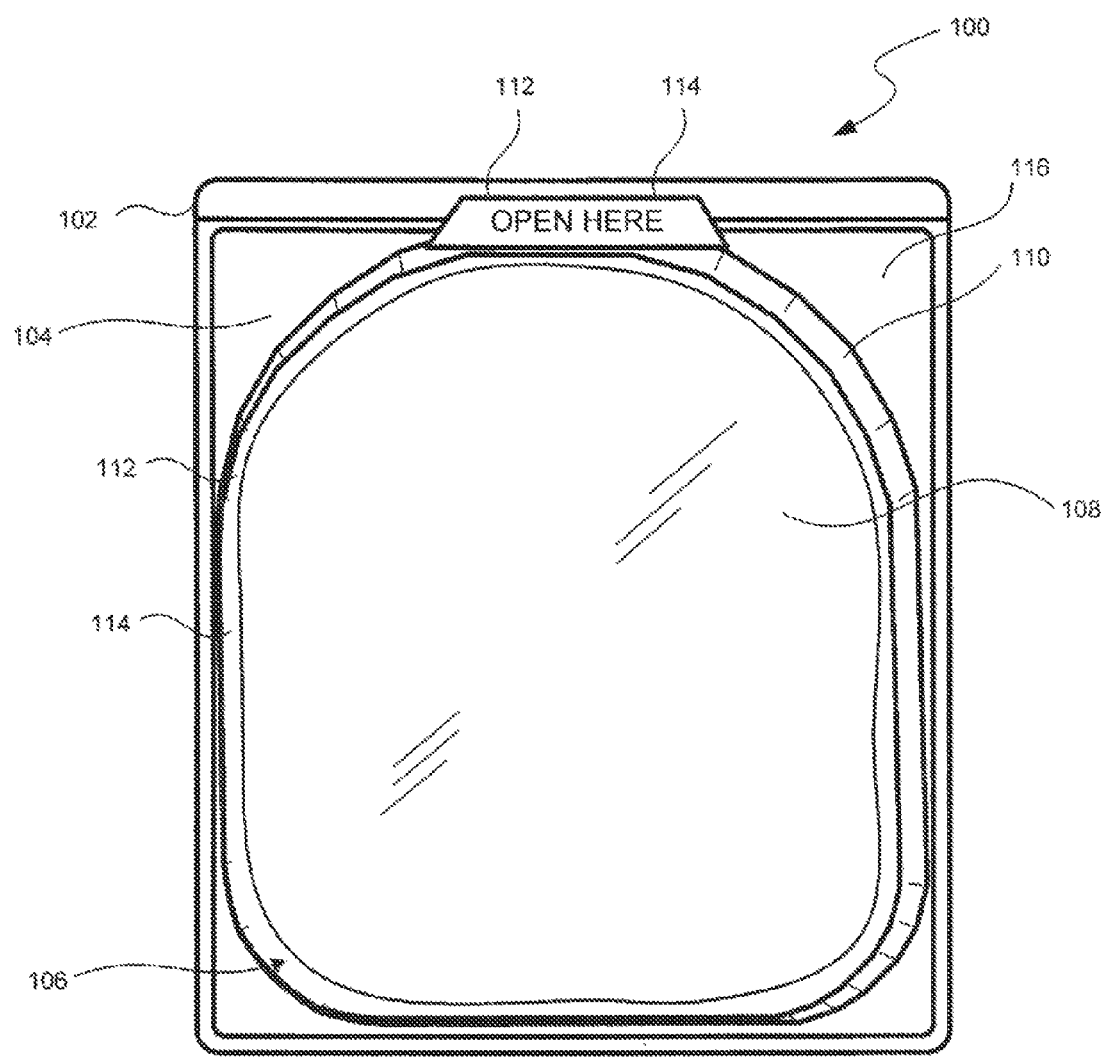
FIG. 1A is a top view of a package configured in accordance with several embodiments of the disclosure.

FIG. 1A is a top view of a package 100 configured in accordance with several embodiments of the disclosure. In the illustrated embodiment, the package 100 includes a tray 102 having a compartment 110 that receives a perishable product 108. The product 108 can be a perishable food, e.g., deli meat, cheese, peaches, applesauce, and/or other perishable products that can be pasteurized. The compartment 110 can be a cavity, indent, and/or other suitable portion of the tray 102 that can receive the product 108. The tray 102 can mate with the product 108. Two objects are said to mate when they have generally similar shapes, and one object can receive the other due to its larger size. In FIG. 1A, for example, the compartment 110 has larger dimensions than those of the product 108 and has a generally similar shape as the shape of the product 108. Thus, the compartment 110 can receive and mate with the product 108. In other embodiments, the compartment 110 can have a different shape that is generally similar to the shape of the product 108 it receives. In at least several embodiments, the correspondence between the shape of the compartment 110 and the shape of the product 108 need not be exact. It is generally sufficient that the overall outer bounds of the shape be at least approximately geometrically similar. In some embodiments, the tray 102 can include a plurality of compartments 110 having shapes generally similar to those of the products they contain, and dimensions larger than those of the products.

The tray 102 can be made from a flexible, semi-rigid, and/or rigid tray material that can be formed into a desired shape before the tray 102 receives the product 108, and that can fully or partially recover to the initial shape of the tray after deformation during HPP. In some embodiments, for example, the tray material is a thermoplastic that can be formed into a shape and has enough resiliency to expand back to its initial shape after compression (e.g., approximately 15%) experienced during HPP. In other embodiments, the tray 102 can comprise other plastic materials, metals, and/or other suitable materials that have enough rigidity to form a desired shape and enough elasticity to recover after deformation from HPP.

The tray 102 can be formed using suitable tray forming methods known to those skilled in the art. In some embodiments, for example, a thermoform fill-seal ("TTFS") machine can shape a thermoplastic into the tray 102. Suitable TTFS machines include the R535 available from Multivac® of Kansas City, Mo., and the PowerPak$^{NT}$ from CFS of Bakel, the Netherlands. In other embodiments, a traysealer can be used to form a foamed material into the tray 102. Suitable traysealing machines include, for example, the T800 from Multivac® and the Twinstar® 9 Traysealer from CFS.

In some embodiments, the tray 102 can be formed to have a shape corresponding to the dimensions and/or shape of a particular product. As an example, a TTFS machine can receive a material (e.g., a thermoplastic), heat the material, form the material into a tray having a compartment shaped like the shape of a product, and load the product into the tray. In some other embodiments, a machine can pre-form a tray such that a compartment of the tray has a shape that can adequately receive and mate with a product. As an example, a TTFS machine can shape pre-formed trays according to a design specification so compartments in the trays can mate with products having a specified size and shape.

The package 100 also includes a cover or lid 104 that can hermetically seal the product 108 within the compartment 110. As illustrated in FIG. 1A, the lid 104 can be attached to an upper peripheral portion 116 of the tray 102. The lid 104 can be attached to the upper peripheral portion 116 using an adhesive, a snap, heat seal, a mechanical interference between the tray 102 and the lid 104, and/or other suitable attachment devices that can form a hermetic seal. For example, the Multivac® R535 machine described above can heat seal the lid 104 to the upper peripheral portion 116. In other embodiments, the lid 104 can be sealed to another portion of the tray 102.

The lid 104 can be made from a generally flexible and/or semi-rigid lidding material. For example, the lidding material can include plastic (e.g., styrene, PVC), film, paper, foil, and/or another suitable material that can be attached and sealed to the tray 102. In various embodiments, the same material can be used to form the lid 104 and the tray 102 and/or the lid 104 and the tray 102 can be integrally formed.

Free space within the package 100 (e.g., the difference between the dimensions of the compartment 110 and the product 108) can include an internal atmosphere 106. The internal atmosphere 106 is a gas or gas mixture such as nitrogen, carbon dioxide, oxygen, and/or another suitable gas that can be hermetically sealed within the package 100. In some embodiments, the internal atmosphere 106 can extend the shelf-life of the product 108.

The internal atmosphere 106 can be added into the package 100 and sealed between the tray 102 and the lid 104 using suitable gas flushing methods. For example, a gas flushing machine can raise the tray 102 to a vacuum-tight seal chamber where the machine can remove the ambient air from the package 100. The machine can then add the internal atmosphere 106 between the tray 102 and the product 106 using pins and/or a nozzle and apply heat and/or pressure to hermetically seal the lid 104 to the tray 102. In other embodiments, a gas flushing machine can add the internal atmosphere 106, then remove the ambient air, and seal the lid 104 to the tray 102. Suitable gas flushing machines include, for example, the Twinstar® 9 Traysealer from CFS. In some other embodiments, gas flushing can include displacing the ambient air inside the package with the internal atmosphere 106 and sealing the lid 104 to the tray 102. In yet other embodiments, the internal atmosphere 106 can be added between the sealed tray 102 and lid 104 using other suitable methods. For example, controlled atmosphere packaging ("CAP") can control the internal atmosphere 106 with an external apparatus or internal chemical reactions.

Figure 1B:
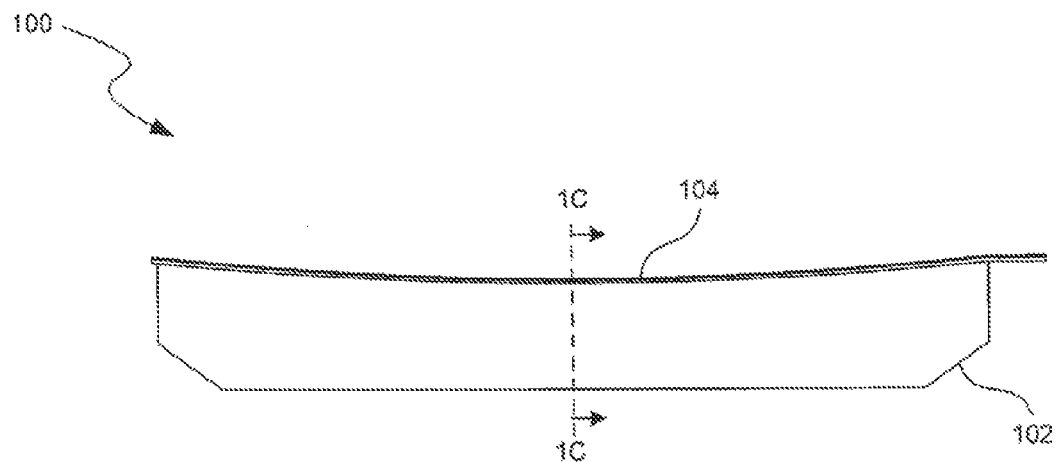
FIG. 1B is a side view of the package of FIG. 1A.

As illustrated in FIGS. 1B and 1C, the internal atmosphere 106 can create a pressure within the package 100 that slightly collapses the lid 104 (e.g., deflect the lid 104 inwardly toward the compartment 110) against the product 108. As an example, gas flushing the package 100 with the internal atmosphere 106 can create a pressure of 2.901 psi (200 mbar) within the package. An external atmospheric pressure of 14.707 psi (1014 mbar) creates a net pressure of 11.806 psi (814 mbar) on the package 100 that slightly compresses the lid 104 against the product 108. The collapsed lid 104 can restrict the movement of the product 108 within the package 100 to prevent damage to the product 108 during other manufacturing processes (e.g., HPP) and/or handling.

The internal atmosphere 106 can act as a padding around the product 108 that protects the product 108 from undesirable pressure. In some embodiments, for example, the internal atmosphere 106 can form a gas barrier that prevents the pressure exerted on the package 100 during HPP from crushing the product 108. The internal atmosphere 106 can also protect the product 108 when the package 100 is exposed to an external atmosphere (e.g., a pressure of 14.707 psi (1014 mbarD. The volume of the internal atmosphere 106 necessary to provide adequate pressure relief can depend on the relationship between the size, shape, and depth of the tray and the size, shape, and height of the product. As an example, the internal atmosphere 106 can create a gas pressure within the tray 102 that can range from approximately 14.707 psi (150 mbar) to approximately 5.802 psi (400 mbar). In other embodiments, the gas pressure can be higher or lower.

The package 100 can undergo HPP to pasteurize the product 108 and extend the product's shelf life. Suitable HPP techniques are available from the American Pasteurization Company of Milwaukee, Wis. During HPP, the package 100 can be placed into an enclosure that applies high pressure to a surface area of the product 108 for a duration of time that pasteurizes the product 108. For example, the package 100 can be placed in a tank of water and hydraulic pressure can be applied to the exterior surface of the package 100. The level of pressure (e.g., approximately 80,000 psi (5,516 bar) to approximately 90,000 psi (6,205 bar)) and duration (e.g., 1 to 6 minutes) necessary to attain pasteurization can depend on the density, pH levels, and/or other attributes related to the product 108. For example, HPP of a sliced deli meat product can include placing the package 100 in a tank of water and applying a pressure of 87,000 psi (5,998 bar) for 1.5 to 3 minutes. If the product 108 has a lower pH and/or a lower density than the deli meat, the HPP process can be carried out at a lower pressure and/or for a shorter period of time. The opposite can be true if a product has a higher pH level and/or is denser.

The package 100 can withstand HPP without rupturing the package 100, despite having free space between the package 100 and the product 108. Mating the tray 102 to the product 108 and gas flushing the package 100 with the internal atmosphere prevent the tray 102 from breaking under the high pressures of HPP. During conventional HPP, for example, the application of pressure may compress trays such that they collapse into any free space within the package. The high pressure can collapse the trays so far into the free space, that the trays rupture and/or cannot retain their original shape. However, the package 100 only allows the tray 102 to collapse until the tray 102 contacts the product 108 and/or the internal atmosphere 106 restricts the movement of the tray 102. The product 108 and/or the internal atmosphere 106 can support the tray 102 and prevent the tray 102 from collapsing until failure. The generally similar shapes of the product 108 and the compartment 110 ensure that the package 100 reduces or eliminates the unsupported free space that would cause the tray material to fail or the hermetic seal between the tray 102 and the lid 104 to rupture. After HPP, the tray 102 can fully or substantially recover to its original shape. Advantageously, mating the tray 102 with the product 108 can also reduce the amount of liquid, known to those skilled in the art as "purge," released from the product 108 during the application of high pressure. For example, the generally similar shapes of the tray 102 and the product 108 limit the voids within the package 100 in which the purge can rest.

Gas flushing the internal atmosphere 106 into the package 100 can also relieve some pressure on the product 108 before, during, and after HPP. For example, the internal atmosphere 106 can provide a barrier of free space around the product 108 that prevents HPP from smashing the product 108. Additionally, gas flushing can slightly collapse the lid 104 to prevent the product 108 from moving substantially within the tray 102. Slightly collapsing the lid 104 can also prevent the application of non-uniform pressure on the product 108 during HPP and subsequent handling.

The package can provide adequate free space (e.g., greater than 10%) within the package 100 to preserve the integrity of distinct portions and/or components of the product 108 during HPP. As an example, the package 100 can contain slices of a product 108 (e.g., cheese) and maintain the separability of the individual slices after HPP. As another example, the package 100 can contain a non-homogenous product 108 (e.g., fruitcake) and maintain the distinction between individual textures and particles of the product. The package 100 can also contain a homogeneous product (e.g., applesauce) and maintain its consistency.

As illustrated in FIG. 1A, in some embodiments, the package 100 can further include an easy open feature 112. Packages that undergo HPP are generally difficult to open because they are often tightly sealed to prevent damage to the package during the application of high pressure. The package 100, however, can include the easy open feature 112 that allows a consumer to open the package 100 without excessive force and/or tools (e.g., scissors, knives, etc.). The easy open feature 112 can be a tear tab, an easy-to-peel corner, a serrated cut, and/or another feature known to those skilled in the art that simplifies opening the package 100.

As further illustrated in FIG. 1A, the package 100 can include a reseal feature 114 that can facilitate reclosing the package 100 after it has been opened (e.g., after partial use of the product 108 by a consumer) and seal the product 108 from further exposure to ambient air. In the embodiment illustrated in FIG. 1A, for example, the reseal feature 114 is an adhesive film that secures and at least substantially seals two portions (e.g., the lid 104 and the tray 102) of the package 100 together. In other embodiments, the reseal feature 114 can include a Ziploc® closure, mechanical interference between the tray 102 and the lid 104, and/or other suitable features that can reseal the package 100. As illustrated in FIG. 1A, the reseal feature 114 and the easy open feature 112 can be a single feature. In other embodiments, the reseal feature 114 and the easy open feature 112 can be distinct features.

Figure 2:
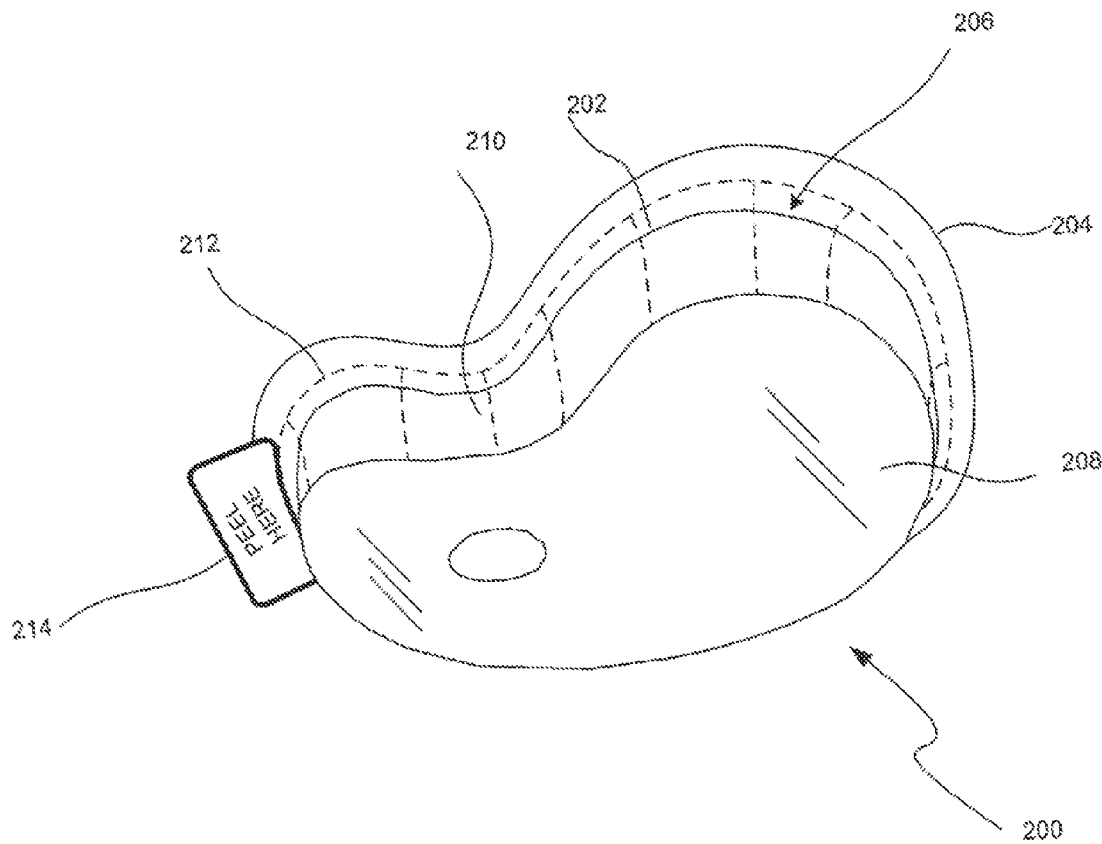
FIG. 2 is a bottom isometric view of a package configured in accordance with several other embodiments of the disclosure.

FIG. 2 is a bottom isometric view of a package 200 configured in accordance with several embodiments of the disclosure. The package 200 illustrated in FIG. 2 includes several features that are generally similar in structure and function to that of the corresponding features of the package 100 described above with reference to FIGS. 1A-C. For example, the package 200 includes a tray 202, a lid 204, a product 208, an internal atmosphere 206, and a compartment 110. The compartment 210 is shaped generally similar to the product 208 (e.g., a cut of meat). The compartment 210 has larger dimensions than those of the product 208 it contains and can mate with the product 208. The package 200 further includes an easy open feature 212 and a reseal feature 214. In the embodiment illustrated in FIG. 2, the easy open feature 212 is a serrated edge on the lid 104 and the reseal feature 214 is a tear tab. In some embodiments, the package 200 can include different easy open features 212 and/or different reseal features 214. Similar to the package 100 of FIGS. 1A-C, the package 200 illustrated in FIG. 2 can include more than 10% free space.

The package 200 can undergo gas flushing to insert the internal atmosphere 206 into at least a portion of the free space within the package 200. The internal atmosphere 206 can have a volume that provides a barrier around the product 208 to at least partially relieve the product 108 from exposure to undesirable pressures. Additionally, the package 200 can undergo HPP without destroying the integrity of the sections, components, and/or consistencies of the product 208.

Figure 3:
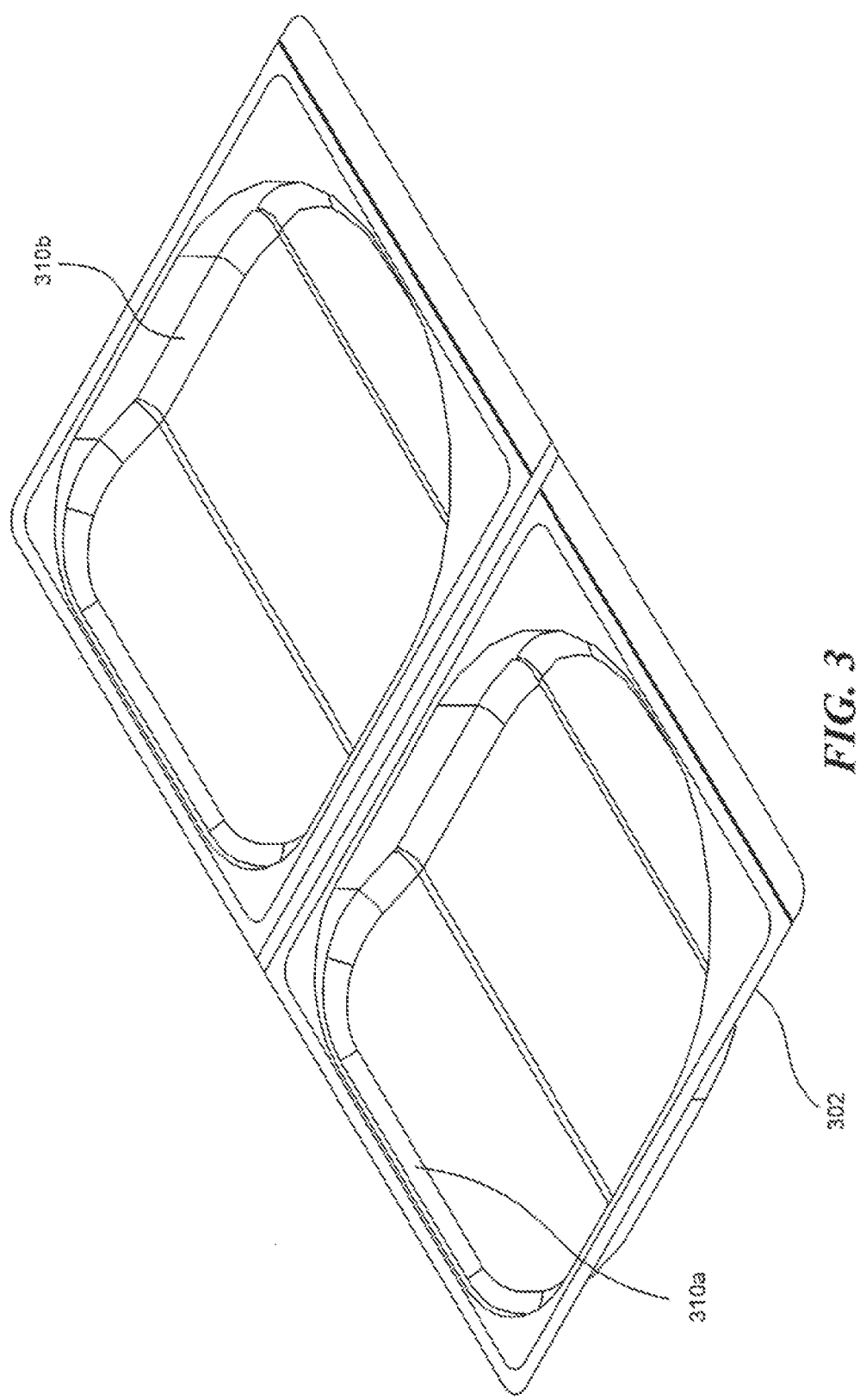
FIG. 3 is an isometric view of a tray configured in accordance with several embodiments of the disclosure.

FIG. 3 is an isometric view of a tray 302 for a package configured in accordance with several embodiments of the disclosure. The tray 302 can have features generally similar to those of the tray 102 illustrated in FIGS. 1A-C. In the illustrated embodiment, however, the tray 302 includes two compartments 310 (identified individually as 310a and 310b), each shaped generally similar to the shapes of the products each compartment 310 is to contain. Each compartment 310 can mate with a product. In other embodiments, the tray 302 can include more than two compartments 310 and/or the individual compartments 310 can be shaped differently.

Figure 4:
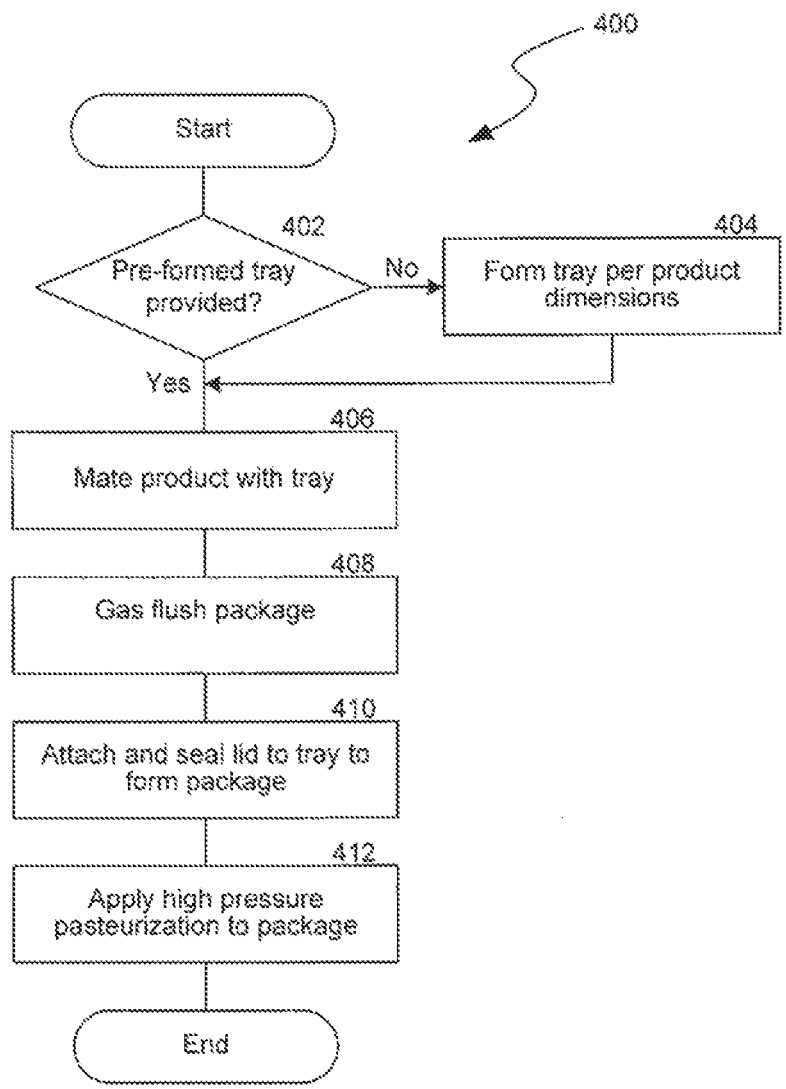
FIG. 4 is a flow diagram illustrating a process for packaging perishable products configured in accordance with several embodiments of the disclosure.

FIG. 4 is a flow diagram illustrating a process 400 for packaging a perishable product configured in accordance with several embodiments of the disclosure. The process 400 can include decision block 402 to determine whether a pre-formed tray is provided. A pre-formed tray can have an indent, a cavity, or a compartment with a shape generally similar to the shape of the perishable product. If a pre-formed tray is provided, the process 400 can continue at block 406. Alternatively, if a pre-formed tray is not provided, the process 400 can continue at block 404. Block 404 includes forming a tray for one or more particular product(s) using suitable tray forming methods (e.g., the Multivac® TTFS machine described with reference to FIGS. 1A-C). The tray can comprise any suitable flexible, semi-rigid, and/or rigid material that can maintain a desired shape before the tray receives a product and can mate with the product in the manner described above.

Block 406 includes mating a product with the tray. In this step, the compartment of the tray can receive the product. The product and internal side walls of the tray can be separated by free space that allows the product to preserve the separability of pieces of the product (e.g. slices of meat or cheese), the consistency of the product (e.g., guacamole), and/or the distinct components of the product (e.g., fruit and nuts in fruit-cake) during subsequent processing.

Block 408 includes gas flushing the tray with an internal atmosphere. Gas flushing can include placing the product and the tray in a sealed environment (e.g., hermetically sealed), removing ambient air (e.g., vacuuming) from around the product, and surrounding the product with the internal atmosphere. The internal atmosphere can comprise a volume of gas (e.g., nitrogen) or mixture of gases (e.g., carbon dioxide and nitrogen) that can form a barrier around the product and relieve the product from exposure to undesirable pressures. The gas flushing step can include methods known to those skilled in the art (e.g., CAP, MAP).

Block 410 includes attaching a cover or lid to a portion of the tray to hermetically seal the internal atmosphere and the product between the lid and the tray. The lid can be attached or bonded to the tray using suitable systems, e.g., the Multivac® R535 described above. The lid can comprise any suitable flexible, semi-rigid, and/or rigid material that can attach and seal to the tray.

In some embodiments, the internal atmosphere can create a low pressure within the package such that the lid slightly collapses inwardly on the product once the package is exposed to an external atmosphere. Collapsing the lid can restrict or prevent movement of the product within the tray to reduce damage from a pressure differential during subsequent processing and handling. As an example, if the external atmosphere is approximately 14.707 psi (1014 mbar), gas flushing can create approximately 14.707 psi (150 mbar) of pressure inside the package so that approximately 12.531 psi (864 mbar) can collapse the lid against the product. In other embodiments, other pressures may be used.

Block 412 includes applying HPP to the package. HPP can include placing the package in a tank and applying a high, uniform pressure (e.g., 87,000 psi (5,998 bar)) that inactivates harmful pathogens in the product. In various embodiments, other conventional methods of HPP can be applied to the package.

The process 400 can produce a package that includes more free space than conventional HPP packages to preserve distinct sections, components, and/or consistencies of the product. The process 400 can also produce a package that reduces the purge secreted from the product during HPP since the mated tray decreases voids within the package in which purge can rest. Additionally, the process 400 can substantially extend the shelf life of the product.

From the foregoing, it will be appreciated that specific embodiments of the present technology have been described herein for purposes of illustration, but that various modifications may be made without deviating from the technology. For example, the embodiments illustrated in FIGS. 1A-C include an irregularly shape compartment. However, other embodiments of the new technology can include trays with compartments that have standard geometric shapes (e.g., circles, rectangles) that correspond to the shapes of the products they are to contain. Additionally, the lid described in FIGS. 1A-4 can be any type of cover, shell, top, and/or membrane that can seal products and internal atmospheres within the package. Certain aspects of the new technology described in the context of particular embodiments may be combined or eliminated in other embodiments. For example, the trays and the lids described in FIGS. 1A-C can be integrally formed. Further, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

The invention claimed is:

1. An at least partially automated method of packaging perishable products, the method comprising:
    forming a compartment in a tray, wherein the compartment is formed to have outer bounds that are substantially similar to a distinct shape of a perishable product;
    placing the perishable product into the compartment of the tray;
    gas flushing the perishable product and the compartment to provide a modified atmosphere;
    hermetically sealing a lid to the tray to form a modified atmosphere package; and
    pasteurizing the perishable product in the package with an application of substantially uniform high pressure to the package.

2. The method of claim 1 wherein:
    gas flushing includes removing at least a portion of oxygen from around the tray and the product and adding a gas at a pressure less than an external pressure to slightly collapse the lid to the product; and
    pasteurizing the product includes positioning the package in an enclosure, applying a pressure of at least 80,000 psi to the surface area of the package, and removing the package from the enclosure, the package having a volume including at least 10% free space.

3. The method of claim 1 wherein forming the tray further comprises:
    selecting the product, the product having a first volume; and
    forming the compartment in the tray to have a shape substantially similar to the distinct shape of the product, wherein the package has a second volume at least 10% greater than the first volume.

4. The method of claim 1 wherein gas flushing further comprises:
    removing at least a portion of oxygen from around the product; and adding the modified atmosphere in a free space between the product and an interior surface of the compartment, the free space comprising at least 10% of a volume of the package.

5. The method of claim 4 wherein adding the modified atmosphere further includes adding a gas at a pressure less than an external pressure to at least partially collapse the lid to the product.

6. The method of claim 1, further comprising forming at least one of an easy open feature and a reseal feature at a surface of the package, wherein the easy open feature is configured to separate the lid from the tray after pasteurization, and wherein the reseal feature is configured to at least substantially seal the product from an external atmosphere after pasteurization.

7. The method of claim 1 wherein the product is a first product, the compartment is a first compartment, the lid is a first lid, the modified atmosphere is a first modified atmosphere, the package is a first package, and the method further comprising:

mating a second product in a second compartment of the tray, the second compartment and the second product having substantially similar shapes; and hermetically sealing a second modified atmosphere and the second product between the tray and a second lid to form a second package.

8. The method of claim 7, further comprising adding the second modified atmosphere in a free space between the second product and an interior surface of the second compartment, the free space comprising at least 10% of a volume of the second package.

9. The method of claim 1 wherein pasteurizing the product further includes applying pressure of at least 80,000 psi to the package without breaking the hermetic seal.

10. The method of claim 1 wherein, after pasteurization, the tray resiliently expands to its pre-pasteurization shape.

11. An at least partially automated method of packaging a perishable product, comprising:

positioning a perishable product in a cavity of a container, wherein the product has a substantially distinct shape and the cavity is formed to have a shape substantially similar to the distinct shape of the product, and wherein the product has a first volume and the cavity has a second volume at least 10% greater than the first volume;

gas flushing a modified atmosphere into a free space, the free space being defined by the difference between the first and second volumes and comprising at least 10% of the second volume;

attaching a cover to a portion of the container, the cover and the container enclosing the product to form a package;

sealing the cover to the container; and applying substantially uniform high pressure to an exterior surface of the package to pasteurize the product.

12. The method of claim 11 wherein gas flushing the modified atmosphere further comprises adding a gas around the product at a pressure less than an external pressure to at least partially collapse the cover to the product.

13. The method of claim 11 wherein applying substantially uniform high pressure further comprises applying at least 80,000 psi to the package without destroying the seal of the package.

14. A packaged perishable product, comprising:

a container having a peripheral surface and a cavity spaced below the peripheral surface, the cavity having outer bounds that define a shape, wherein the shape is selected to at least substantially match a distinct product shape;

a perishable product positioned within the cavity, the product having a first volume and a distinct shape that is at least substantially similar to the shape of the cavity, wherein the compartment is configured to mate with the product;

a cover sealed to the container, wherein the cover and the container form a package having a second volume, wherein the second volume is greater than the first volume, and wherein the package is configured to withstand substantially uniform pressure of at least 80,000 psi; and a modified atmosphere at least partially filling the difference between the first volume and the second volume.

15. The packaged perishable product of claim 14 wherein the first volume is at least 10% smaller than the second volume.

16. The packaged perishable product of claim 14 wherein the cover at least partially contacts the product.

17. The packaged perishable product of claim 14, further comprising an easy open feature on the cover and separate from the seal between the cover and the container, wherein the easy open feature is configured to facilitate opening the package and configured to withstand high pressure pasteurization.

18. The packaged perishable product of claim 14, further comprising a reseal feature on at least one of the container and the cover, the reseal feature being configured to at least substantially seal the product from exposure to an external atmosphere.

* * * * *